C. E. LOWELL.
STEAM TRAP.
APPLICATION FILED FEB. 24, 1919.
1,420,718. Patented June 27, 1922.
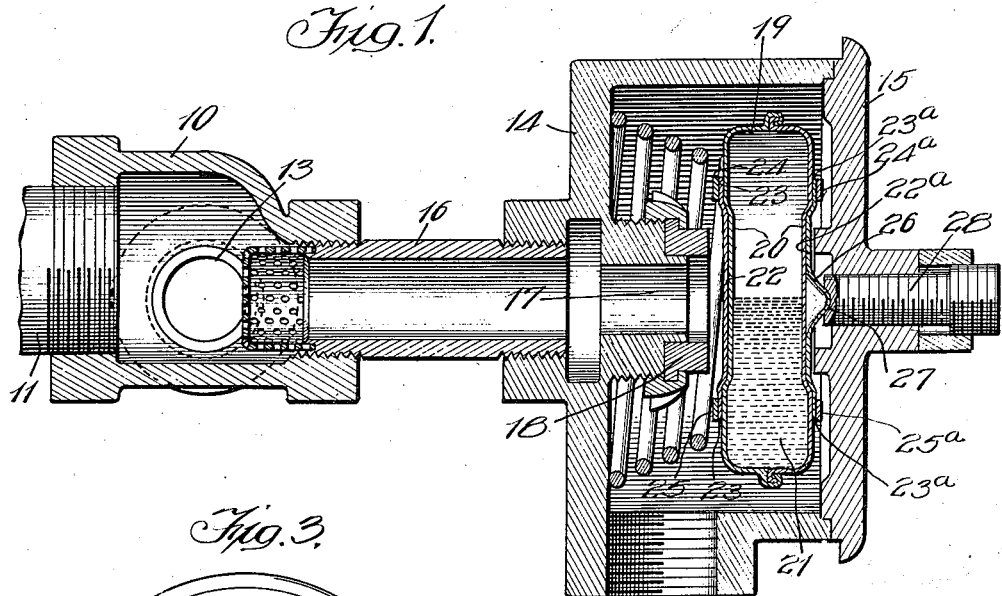
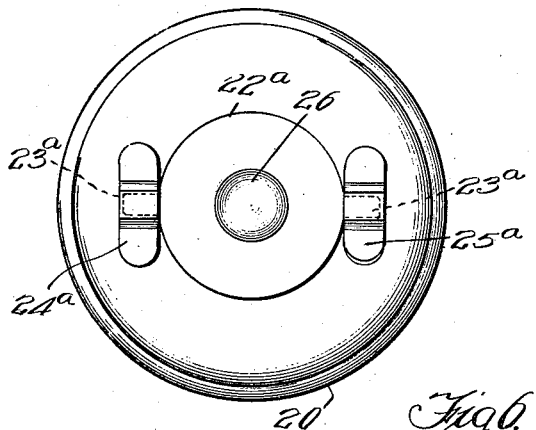
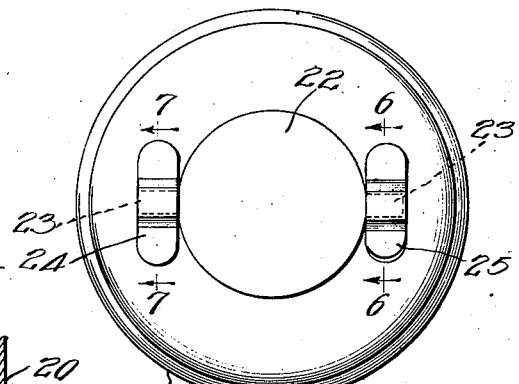
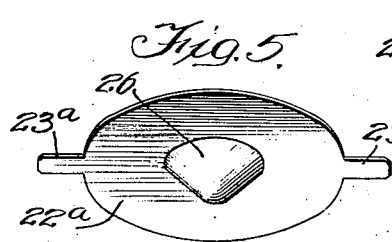
Witnesses:
W. F. Kilroy
Harry R. L. White
Charles E. Lowell, Inventor
by Barnett Truman, Atty.

UNITED STATES PATENT OFFICE.

CHARLES E. LOWELL, OF NEW YORK, N. Y., ASSIGNOR TO VAPOR CAR HEATING COMPANY, INC., OF CHICAGO, ILLINOIS, A CORPORATION OF NEW YORK.

STEAM TRAP.

1,420,718.  Specification of Letters Patent.  Patented June 27, 1922.

Application filed February 24, 1919. Serial No. 278,750.

*To all whom it may concern:*

Be it known that I, CHARLES E. LOWELL, a citizen of the United States, residing at New York, in the county of New York and State of New York, have invented certain new and useful Improvements in Steam Traps, of which the following is a specification.

My invention relates to steam traps of the types used in connection with the steam train line or steam heating systems of railway cars and relates more particularly to improvements in steam traps of the above character in which a closed vessel containing a liquid which volatilizes at a pre-determined temperature is supported adjacent the outlet of the train line or heating system so as to permit the water of condensation to be discharged therefrom without permitting the escape of any appreciable amount of steam. These vessels operate similar to a double walled diaphragm and are generally known in this art as expansible diaphragms and thermostatic vessels.

In heating systems provided with the above type of steam trap, the water of condensation is collected in the discharge duct when the discharge port of said duct is closed. As soon as a sufficient amount of water has collected in the duct to prevent the heat from the steam coming into contact with the vessel, the volatilized fluid in the vessel condenses and permits the flexible walls of the same to move inwardly so as to open the port of the discharge duct. As soon as all of the water of condensation is discharged and the steam comes into contact with the vessel the fluid in the vessel is again volatilized so as to expand the vessel and close the said port. In order that the walls of the thermostatic vessel be sufficiently flexible and also to insure that the liquid in the vessel will readily respond to the temperature adjacent the discharge opening of the heating system, the walls of the vessel are made of a relatively thin flexible metal such, for example, as brass. It often happens that the vessel when fully expanded after being in use for some time, will not entirely close the discharge opening and this permits small jets of steam to escape which have a tendency to wear away the walls of the vessel very rapidly. The walls of the said vessel being relatively thin, are also weakened by the wearing away of the central porton of the cell which is repeatedly subjected to frictional contact with the end of the discharge duct by being seated across the discharge port when the heating system is in operation.

My invention has for one of its objects to overcome the above disadvantage and minimize the expense of maintaining the above type of steam trap in operative condition by providing a novel and inexpensive protecting plate which is detachably secured to the thermostatic vessel and adapted to seat against the end of the discharge duct so as to protect the walls of the thermostatic vessel from being damaged by the above mentioned or other similar causes.

In certain types of steam traps, the opposite faces of the thermostatic vessels are provided with substantially flat surfaces and in certain other types one face of the vessel is provided with a central projection which seats in an adjusting screw. This difference in the construction of the vessels make it necessary for the railroads to carry two types of cells in stock. My invention aims to provide a retaining element which is detachably secured to one face of the thermostatic vessel and provided with the usual projection which seats in the usual cavity of an adjusting screw. My invention also contemplates that the above protecting and retaining elements be secured to the thermostatic vessel in substantially the same manner, on opposite faces thereof so that their position may be changed from one face of the vessel to the other when it is desired to reverse the position of the vessel.

The invention consists in the novel construction and combination of parts hereinafter described and claimed for carrying out the above stated objects and such other objects as may appear from the following description.

The preferred embodiment of the invention is illustrated in the accompanying drawing wherein:

Fig. 1 is a vertical sectional view of a steam trap showing the thermostatic vessel thereof constructed in accordance with my invention.

Figs. 2 and 3 are views in elevation of opposite faces of the thermostatic vessel shown in Fig. 1.

Fig. 4 is a perspective view of the removable plate adapted to be secured to the face of the thermostatic vessel as shown in Figs. 1 and 2.

Fig. 5 is a perspective view of an embossed retaining plate adapted to be detachably secured to the face of the thermostatic vessel as shown in Figs. 1 and 3, and Figs. 6 and 7 are fragmentary sectional views taken on lines 6—6 and 7—7 respectively of Fig. 2.

Like characters of reference designate like parts throughout the several figures of the drawing.

Referring to the drawing, 10 designates a fitting which for the purpose of convenience is shown secured to the outlet end 11 of a railway car steam heating system. This fitting is preferably provided with a plurality of tapped openings 13 so that it can be interposed in the steam train line, for example, or be used in any other situation desired. The steam trap shown in the drawing comprises a casing 14 having a closure cap 15 and is connected with the fitting 10 by means of a pipe 16 providing a discharge duct for the water of condensation which drains out of the heating system. The interior of the casing is provided with a boss having a central opening providing a discharge port 17 which establishes communication between the interior of the casing 14 and the discharge duct 16. A removable seat 18 of suitable material surrounds the discharge port 17. The discharge port 17 is closed and opened by the expansion and contraction of a thermostatic member designated generally at 19. This member consists of a closed vessel having flexible walls 20—20 and containing a quantity of liquid 21 which volatilizes at a temperature below that of steam. When the said liquid is volatilized the internal pressure in the vessel 19 causes the walls 20—20 to expand outwardly to close the discharge port 17. One of the walls 20 of the vessel is provided with a flat wear plate which, when the vessel is expanded, bears against the seat 18 so as to protect the wall of the vessel from being worn away by the repeated frictional contact of its surface against the seat element 18 and the escape of small jets of steam. This protection or wear plate consists of a disk 22 provided with stub arms 23—23 one of which extends under a metal strip 24 having its ends braised or otherwise suitably secured to the cell and the other arm is forced under the spring end of a spring clip 25. When one face of the disk 22 becomes worn so as not to properly seat against the seat 18, the disk may be readily removed and re-inserted in inverted position. The arms, 23—23, being of a thin flexible material, can readily be bent to conform with the contour of the flexible wall to which the disk is applied. The opposite side of the thermostatic cell is provided with similar spring clips 24$^a$ and 25$^a$ which receive the arms 23$^a$—23$^a$ of a disk 22$^a$. This disk is formed with a central cut pressed boss 26 which seats in a cavity 27 of an adjusting screw 28. The thermostatic vessel when contracted, is held in operative position by means of a coiled spring 29 which exerts a pressure against one face of the vessel so as to keep the boss 26 seated in the cavity 27 of the adjusting screw.

The disks 22—22$^a$ may be applied to either face of the thermostatic vessel and if desired the vessel may be readily reversed in the event that one face is subjected to more wear than the other.

By the use of my improved construction, in which the resilient disks or plates 22 and 22$^a$ are held in position by radially extending arms which have sliding engagement with the supporting clips carried by the opposite diaphragm faces of the receptacle or vessel 19, the outer edge portions of such plates are free to have a sliding movement with respect to the faces of the receptacle when such faces are buckled outwardly by the expansion of the liquid 21. This provision for sliding movement adds very materially to the sensitiveness of the device as compared to those constructions in which a plate or shield, such as the part 22, is secured in position without adequate provision for the plate to yield.

I claim:

1. A thermostatic element comprising a closed vessel having a flexible face, clip elements on said face and a plate detachably connected to said face and adapted to protect the same from wear comprising a disk provided with arms which fit under said clip elements.

2. A thermostatic element comprising a closed vessel having flexible faces, spring clips on said faces, and protecting and retaining devices detachably connected to said faces comprising disks provided with arms adapted to be inserted under said spring clips.

3. A thermostatic element comprising a closed vessel having flexible faces, spring clips on said faces, and protecting and retaining devices detachably connected to said faces comprising disks provided with arms adapted to be inserted under said spring clips, one of said disks being provided with a central projecting element for the purpose described.

4. In a steam trap of the character described, the combination with a casing provided with a discharge port, of a thermostatic member for opening and closing said port, comprising a closed expansible vessel, a plate detachably secured to one face of said vessel and adapted to seat across said discharge port to close the same, a retaining element comprising a plate removably secured to the opposite face of said vessel and provided with an outwardly projecting boss, and means providing a seat for said boss whereby the said vessel is supported in a concentric position with relation to said discharge port.

5. The combination of a receptacle having opposite faces in the form of diaphragms held in spaced relation by interposed side walls, resilient plates engaging said faces, the flexible outer edge portions of each plate being free to have a sliding movement with respect to the diaphragm with which it is in engagement when such diaphragm is buckled toward the plate, a supporting member opposite one of said plates, yielding means for holding said receptacle in position with said plate in contact with said supporting member, and a hollow seat member in position opposite the other plate and adapted to be closed by contact with the plate when said faces are buckled outwardly.

CHARLES E. LOWELL.